UNITED STATES PATENT OFFICE.

WILLIAM THOMPSON, OF RAHENY, IRELAND.

IMPROVEMENT IN MANUFACTURE OF PRUNE-WINES.

Specification forming part of Letters Patent No. 193,298, dated July 17, 1877; application filed May 31, 1877.

*To all whom it may concern:*

Be it known that I, WILLIAM THOMPSON, of Raheny, in the county of Dublin, Ireland, have invented an Improvement in the Manufacture of Prune-Wine; and do hereby declare that the following description forms a full and exact specification of the same, wherein I have set forth the nature and principles of my said improvement, by which my invention may be distinguished from others of a similar class, together with such parts as I claim, and desire to secure by Letters Patent—that is to say:

In the specification to Letters Patent granted to me on the 27th February, 1866, No. 52,943, I described the manufacture of prune-wine as a substance to be used for fining, purifying, and mellowing spirituous liquors.

My present invention relates to an improvement in the manufacture of this substance, whereby it is produced at less cost and of better quality than by the process set forth in the specification above referred to.

According to my improved process I first make an extract of prunes as follows: I grind forty hundred-weight of French prunes, and steep them for not less than two months in one hundred and eight gallons of rectified spirit of wine about fifty-five degrees overproof, mixed with ten gallons of water. The liquor thus produced is the extract of prunes, which I employ as hereinafter described. I grind twenty hundred-weight of raisins and steep them for about seven days in four hundred gallons of water, preferably distilled. I then draw off the liquor and mix it in a vat with fourteen hundred-weight of best refined sugar, and forty gallons of the extract of prunes above mentioned. This mixture is fermented for about two months at a temperature of 70° to 80° Fahrenheit; it is then fined and drawn off into small casks, where it is allowed to stand for about five weeks, whereupon it is ready for use, as described in the specification above referred to.

The proportions above stated of the ingredients may be somewhat varied; those which I have given answer well in practice.

Having thus described the nature of the said invention, and in what manner the same is to be performed, I claim—

1. For the manufacture of prune-wine, extract of prunes prepared by steeping French prunes for about two months in rectified spirits, mixed with water, substantially as herein described.

2. An improved prune wine compounded of the liquor produced by steeping ground raisins in water with sugar, and extract of prunes prepared as set forth in the first claim, such mixture being fermented at a temperature of from 70° to 80° Fahrenheit, and then fined, substantially as herein described.

In testimony whereof I have signed my name to this specification in the presence of two subscribing witnesses this 16th day of May, 1877.

WILLIAM THOMPSON.

Witnesses:
   WM. A. TROUT,
      *35 College Green, Dublin.*
   WM. I. MOLLOY,
      *35 College Green, Dublin.*